US010359009B1

(12) United States Patent
Eckert

(10) Patent No.: US 10,359,009 B1
(45) Date of Patent: Jul. 23, 2019

(54) HEAT EXCHANGER FOR ENGINE

(71) Applicant: Eckert Engine Company, Palmer Lake, CO (US)

(72) Inventor: Timothy J. Eckert, Palmer Lake, CO (US)

(73) Assignee: Eckert Engine Company, Palmer Lake, CO (US)

( * ) Notice: Subject to any disclaimer, the term of this patent is extended or adjusted under 35 U.S.C. 154(b) by 0 days.

(21) Appl. No.: 15/410,771

(22) Filed: Jan. 20, 2017

Related U.S. Application Data

(63) Continuation of application No. 14/612,283, filed on Feb. 2, 2015, now abandoned, which is a continuation of application No. 14/493,327, filed on Sep. 22, 2014, now abandoned, which is a continuation of application No. 14/324,362, filed on Jul. 7, 2014, now abandoned, which is a continuation of application No. 14/211,269, filed on Mar. 14, 2014, now abandoned.

(60) Provisional application No. 61/784,989, filed on Mar. 14, 2013.

(51) Int. Cl.

| | |
|---|---|
| ***F02B 3/06*** | (2006.01) |
| ***F02M 31/06*** | (2006.01) |
| ***F02M 31/10*** | (2006.01) |
| ***F02M 31/16*** | (2006.01) |
| ***F02M 31/18*** | (2006.01) |
| ***F02M 31/125*** | (2006.01) |

(52) U.S. Cl.
CPC ............ *F02M 31/16* (2013.01); *F02M 31/06* (2013.01); *F02B 3/06* (2013.01); *F02M 31/10* (2013.01); *F02M 31/125* (2013.01); *F02M 31/18* (2013.01)

(58) Field of Classification Search
CPC ...... F02M 31/16; F02M 31/18; F02M 31/125; F02M 31/10; F02B 3/06
See application file for complete search history.

(56) References Cited

U.S. PATENT DOCUMENTS

| | | | | |
|---|---|---|---|---|
| 5,033,677 A * | 7/1991 | Kumar | F02M 21/12 | 137/605 |
| 5,193,341 A * | 3/1993 | Sibbertsen | F01N 3/037 | 422/180 |
| 2008/0271454 A1* | 11/2008 | Hansen | F01K 23/065 | 60/670 |
| 2011/0073048 A1* | 3/2011 | Juan | F22B 1/26 | 122/24 |

* cited by examiner

*Primary Examiner* — Jacob M Amick
*Assistant Examiner* — Charles Brauch

(57) ABSTRACT

A heat exchanger for an engine is disclosed. The heat exchanger includes a vortex tube and a gas return path. Expansion media tubes, which have a working fluid therein, are located between the vortex tube and the gas return path. Hot gases in the vortex tube, along with warm gases in the return path, heat the working fluid. In one embodiment, the working fluid is delivered to a cylinder in which it expands, so as to move a piston. In one embodiment, the working fluid is fuel. In one embodiment, after the working fluid expands in the cylinder, it is recovered and burned in a combustion chamber, which is in fluid communication with the vortex tube. In one embodiment, the working fluid is water.

11 Claims, 4 Drawing Sheets

Fuel Vapor Manifold Inlet 195
Fuel Vapor Manifold 205
Separation Cone 130
Gas Return Path 160
Inlet Outlet Manifold 330
Spark Plug 310
Combustion End
Outer Case
Vortex Tube 110
Exhaust 140
Fresh Air Inlet 185
Expansion Media Tubes 150
Expansion Media Tube Encapsulation
Fresh Air Manifold 215
Gas Return Path 160
(Heat Transfer Material that surrounds Tube and Protects Them from Corrosion)
Combustion Chamber 120
Fuel Vapor Manifold 205

HEAT EXCHANGER FOR ENGINE

CROSS-REFERENCE TO RELATED APPLICATIONS

This application is a continuation of U.S. patent application Ser. No. 14/612,283 filed Feb. 2, 2015, which is a continuation of U.S. patent application Ser. No. 14/493,327 filed Sep. 22, 2014, which is a continuation of U.S. patent application Ser. No. 14/324,362 filed Jul. 7, 2014, which is a continuation of U.S. patent application Ser. No. 14/211,269 filed Mar. 14, 2014, which claims the benefit of U.S. Provisional Application No. 61/784,989 filed Mar. 14, 2013, all of which are incorporated herein by reference in their entireties.

FIELD OF THE INVENTION

The present invention relates generally to heat exchangers for engines.

BACKGROUND OF THE INVENTION

Steam engines use steam as its working fluid to perform mechanical work. Steam engines include a boiler (also referred to as a steam generator) and a motor as its main components.

Commonly, combustible materials are burned, so as to boil water to create steam. Two main types of boilers are used, namely, a water-tube boiler and a fire-tube boiler. In the case of a water-tube boiler, hot gases created from combustion surround tubes that have water therein. In the case of a fire-tube boiler, hot gases created from combustion travel through tubes that are surrounded by water.

High pressure steam is delivered to the motor, which may include one or more cylinders. When the steam enters a cylinder, it expands and causes a piston inside the cylinder to move. Accordingly, chemical energy from the combustible materials is converted into heat energy in the form of hot gases, which is converted into kinetic energy in the form of steam, which is then converted into mechanical energy through use of the pistons inside the motor. Unfortunately, in steam engines, much of the heat is discarded without being converted into useful mechanical energy.

Furthermore, the water used in steam engines creates many problems. For example, inconveniently, both a fuel tank and a water tank must be replenished (e.g., filled—assuming fuel in a liquid form). As a point of reference, one version of a Stanley Steamer automobile of the early 1900's consumed approximately the same amount of fuel per mile as it did water.

Another problem with using water in steam engines is the need to locate sources of water to refill the water tank. It should be noted that the inventor recognizes that a condenser allows one to travel further without refilling a water tank. However, a significant amount of heat is still wasted with condensers.

Yet another problem of using water in steam engines is that it requires designers to determine how to prevent water from freezing in colder climates. For example, water may need to be mixed with additives to ensure that it has a lower freezing temperature than 0 degrees Celsius.

Yet a further problem is that the boiler must use materials that are somewhat heavy to be able to safely contain its high operating pressures. In addition, the boiler must have a sufficiently large surface area to properly transfer the heat created from combustion, so as to produce steam from water, which also adds to its overall weight.

Yet an even further problem is that water (or steam) promotes corrosion in both the boiler and motor. In addition, water is not compatible with the oil used in the lubrication system of an engine.

Despite all of the aforementioned problems with steam engines, there are several important benefits of steam engines as opposed to conventional (internal combustion) engines which burn fuel in their cylinders. Specifically, a boiler can burn fuel at a leaner mixture than a conventional engine. Accordingly, the fuel is oxidized better, which allows for more complete combustion. Furthermore, fuel and air can be burned at a much higher temperature in a boiler, which also provides a more complete combustion.

For a variety of reasons, internal combustion engines replaced steam engines to power automobiles. Like steam engines, much of the heat generated in internal combustion engines is wasted.

When fuel is burned in an internal combustion engine, the heat must be created and used in a very short time. In the case of a naturally aspirated internal combustion engine operating at 2000 RPM, the power stroke lasts approximately one sixteenth of a second. As a result, much of the fuel passes into the exhaust unburned or partially burned, which creates carbon monoxide.

In addition, there are harmful compounds created when fuel and air are ignited under pressure. Oxides of nitrogen form more easily in an ignited and compressed fuel/air mixture than they do when burned at atmospheric pressure.

Furthermore, a modern automobile uses a catalytic converter to burn some of the fuel that exhausts from the engine unburned. This reduces some of the pollutants, but the heat created in the process, along with the fuel that passes through the catalytic converter unburned, is not converted into useful work and is simply wasted.

In view of the above, it would be desirable to develop a heat exchanger for an engine that increases efficiency as compared to prior systems.

SUMMARY OF THE INVENTION

The present invention is designed to address at least one of the aforementioned problems and/or meet at least one of the aforementioned needs.

In one embodiment, a heat exchanger for an engine is disclosed. The heat exchanger includes a vortex tube and a gas return path in fluid communication therewith. One or more expansion media tubes, which have a working fluid therein, are located between the vortex tube and the gas return path.

Hot gases in the vortex tube, along with warm gases in the gas return path, heat the working fluid. In one embodiment, the working fluid is delivered to a cylinder in which it expands, so as to move a piston.

In one embodiment, the working fluid is fuel. In one embodiment, after the working fluid expands in the cylinder, it is recovered and burned in a combustion chamber, which is in fluid communication with the vortex tube.

In one embodiment, the working fluid is $H_2O$.

Other objects, features, embodiments and advantages of the invention will be apparent from the following specification taken in conjunction with the following drawings.

DETAILED DESCRIPTION

The present invention is directed to a heat exchanger for an engine. An exemplary embodiment of a heat exchanger 100 is illustrated in FIGS. 1-4.

Figure 1:
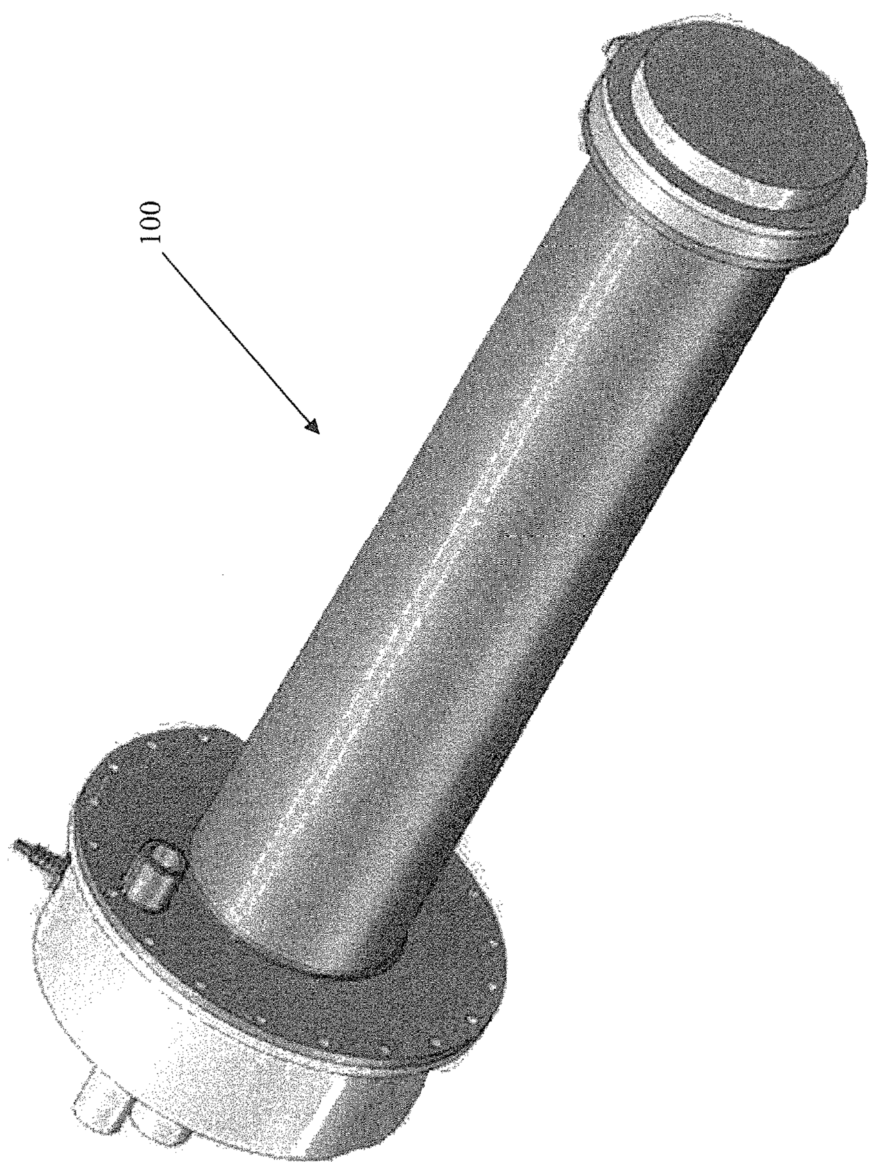
FIG. 1 is a perspective view of a heat exchanger in accordance with an exemplary embodiment of the present invention.
Figure 2:
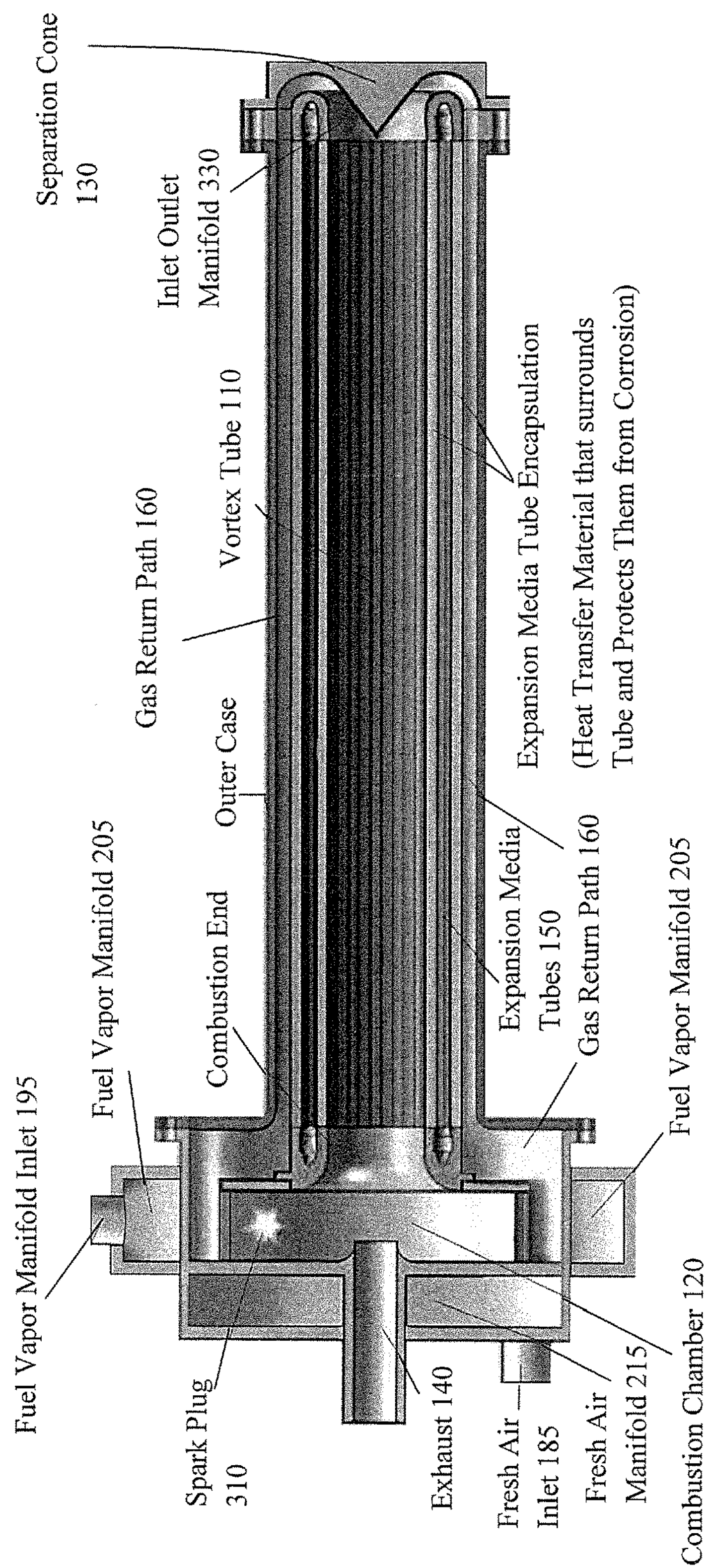
FIG. 2 is a cross-sectional view of the heat exchanger of FIG. 1 illustrating some of its main components.
Figure 3:
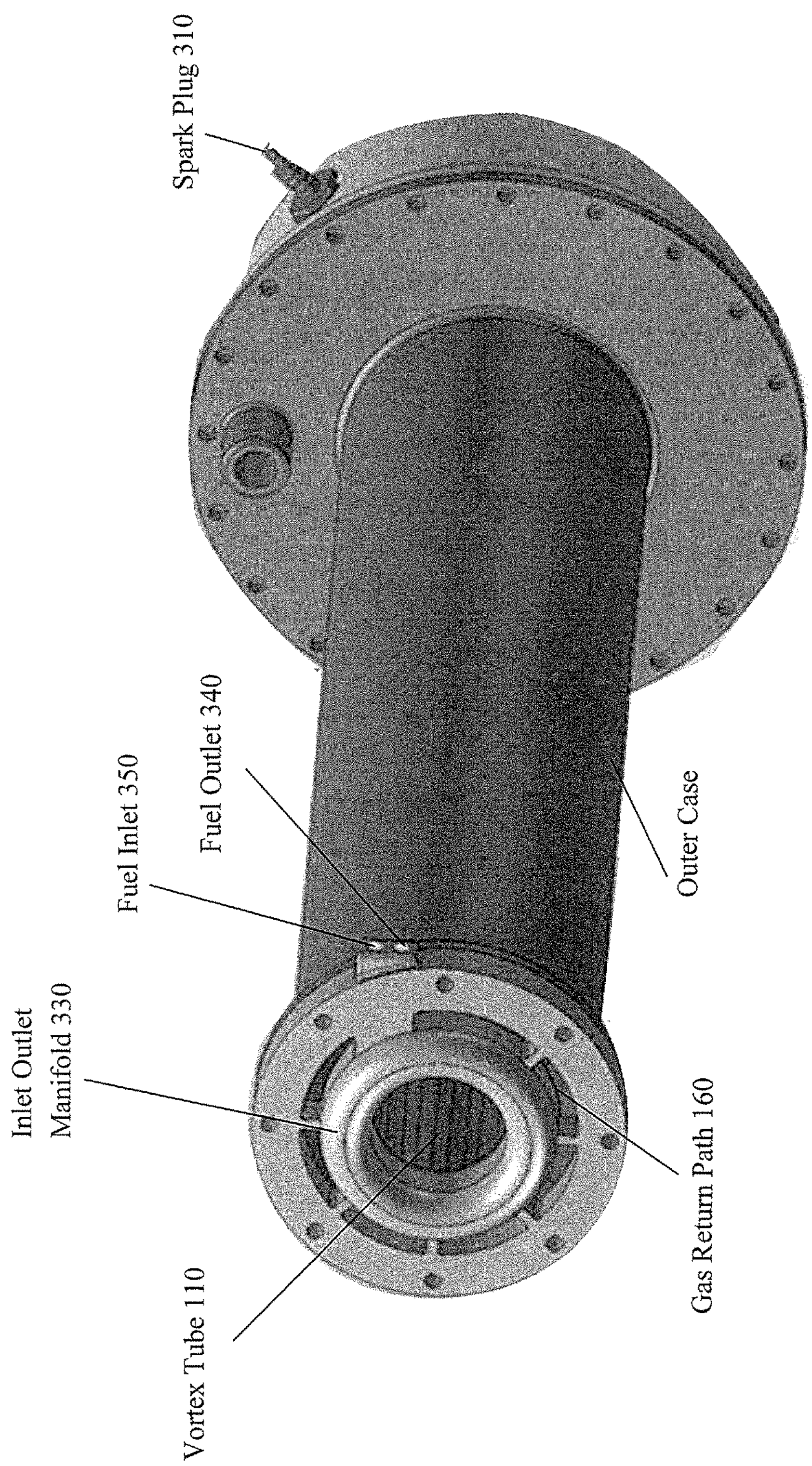
FIG. 3 is a perspective view of the heat exchanger of FIG. 1, wherein the separation cone has been removed therefrom; and, FIG. 4 is a cross-sectional view of the heat exchanger of FIG. 1 illustrating the combustion chamber and the fuel vapor manifold.

With reference to FIGS. 2 and 3, the heat exchanger 100 includes a vortex tube (or first tube) 110 and a combustion chamber 120. The vortex tube 110 and the combustion chamber 120 are in fluid communication with one another.

Figure 4:
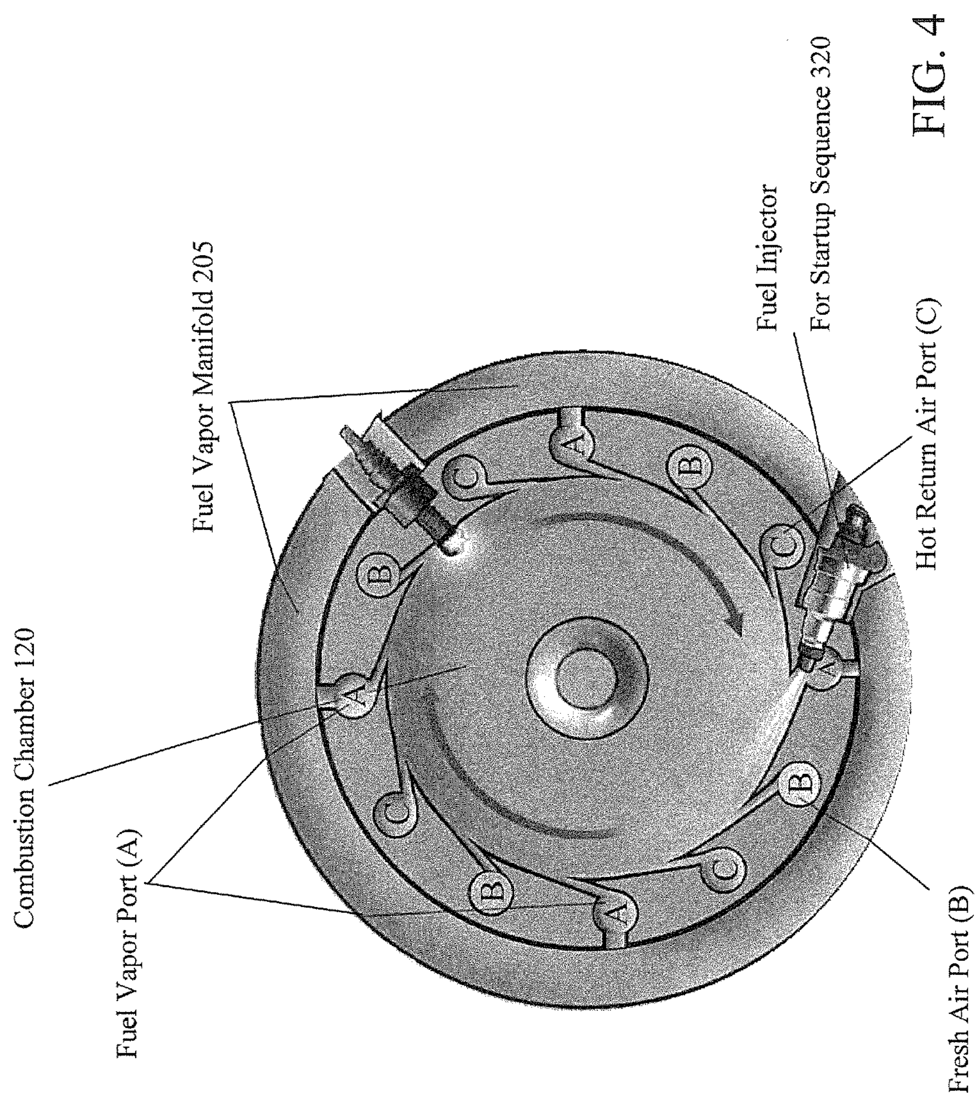

Fuel, which has been combined with air, is ignited in the combustion chamber 120 and moves (for example) in the direction of the arrows in FIG. 4. (Of course, it could move in the opposite direction.) A vortex of burning fuel (along with air), is created (sometimes called a "cyclone of fire"), which is forced into the vortex tube 110.

As demonstrated by Ranque and Hilsch, a vortex tube can separate hot gases from cold gases. The hot gases migrate to the cylindrical wall of the vortex tube 110 while the cold gases migrate toward the center of the vortex tube 110. The gases initially move in a spiral away from the combustion chamber 120 towards a separation cone 130. The hot gases move towards the outer wall of the vortex tube 110 and the colder gases move towards the center of the vortex tube 110. The center area of the vortex tube 110 is only open at the end opposite to the separation cone 130, so the colder gases change direction and move toward (and through) an exhaust 140 according to well-documented principles demonstrated by Ranque and Hilsch.

The hot gases along the wall of the vortex tube 110 are used to heat a working fluid in expansion media tubes 150, which are radially adjacent to the wall of the vortex tube 110. In one embodiment, the expansion media tubes 150 extend linearly from near the combustion chamber 120 to near the separation cone 130.

Circumferentially adjacent expansion media tubes 150 are connected by U-shaped sections near each of the ends of the expansion media tubes 150 (i.e., the end near the combustion chamber 120 and the end near the separation cone 130), so as to allow the working fluid to travel in a first direction (e.g., in a direction from the combustion chamber 120 towards the separation cone 130) when in a first expansion media tube 150 and in a second direction (e.g., in a direction from the separation cone 130 to the combustion chamber 120) when in a second expansion media tube 150 that is circumferentially adjacent to the first expansion media tube 150. By connecting the ends of the expansion media tubes 150 with a sufficient number of U-shaped sections, the working fluid may travel back-and-forth along a path that goes completely (or nearly completely) around the vortex tube 110.

It should be understood that the expansion media tubes 150 may "surround" the vortex tube 110 in other configurations. For example, in one embodiment, one or more expansion media tubes may spiral around the vortex tube 110 from one end to the other end (e.g., the end near the combustion chamber 120 to the end near the separation cone 130).

It should be understood that the term expansion media tubes 150 covers embodiments where a single tube is used or where multiple tubes are used or connected together. It should also be understood that the expansion media tubes 150 do not need to be configured to allow the working fluid to travel along a path that goes completely around the vortex tube 110. Instead, the working fluid may only travel about a portion of the vortex tube 110. Furthermore, it should be understood that the expansion media tubes do not need to be configured to extend from one end of the vortex tube 110 to the other end of the vortex tube 110.

In one embodiment, the expansion media tubes 150 are encapsulated by one or more materials that promote the conduction of heat. In one embodiment, the one or more materials are also corrosion resistant. In one embodiment, the material includes copper. In other embodiments, the material is a copper alloy, aluminum or any other material that is a good conductor of heat.

The wall of the vortex tube 110 may be made of the same material as the materials used to encapsulate the expansion media tubes 150. In one embodiment, the wall of the vortex tube 110 is made of or coated with one or more materials that are different from the material or materials used to encapsulate the expansion media tubes 150.

In one embodiment, the material used to encapsulate the expansion media tubes 150 is in the form of a cylinder having an inner diameter and an outer diameter. The inner diameter forms (or assists in forming) the wall of the vortex tube and the outer diameter forms (or assists in forming) one of the walls of a gas return path (explained below). The expansion media tubes 150 are located between the inner diameter and the outer diameter of the cylinder.

In one embodiment, the expansion media tubes 150 are encapsulated between the vortex tube 110, which has a first diameter and a second cylindrical tube (or tube-like structure) having a second diameter greater than the first diameter.

As mentioned above, hot gases move along the wall of the vortex tube 110 in a direction from the combustion chamber 120 towards the separation cone 130. When the hot gases reach the separation cone 130, they are deflected such that they flow through a gas return path 160 formed between the second cylindrical tube and a third cylindrical tube (or tube-like structure) having a third diameter greater than the second diameter. The hot gases are then drawn back into the combustion chamber, wherein any unburned fuel is again presented for ignition.

In one embodiment, instead of using water (like a conventional steam engine) as the working fluid, the present invention uses fuel. This embodiment advantageously eliminates the need for water and a water tank, which reduces weight and components. Furthermore, the likelihood of the working fluid freezing is reduced, since fuel generally has a lower freezing point than water. In addition, problems associated with water and engine oil mixing are reduced. Yet further, many of the corrosion problems associated with a steam engine are reduced and/or eliminated.

Another benefit of using fuel instead of water is that the expansion media tubes 150 may have thinner walls, since corrosion issues with fuel are less likely to occur than with water (or steam). Having thinner walls reduces the weight of the tubes 150 and permits heat transfer to occur more quickly. Furthermore, a smaller surface area is required for the heat exchanger of the present invention as compared to a conventional heat exchanger for a steam engine, since fuel generally boils at a lower temperature than water. This results in a heat exchanger that is smaller, lighter and more efficient than a conventional heat exchanger for a steam engine.

The working fluid may be any liquid combustible fuel (e.g., gasoline, diesel, kerosene, liquid propane gas, liquid petroleum gas, alcohol, ethanol, etc.) or combinations thereof. It should be understood that other fuels are possible and anticipated.

It should also be understood that the present invention may use water as the working fluid. In such case, a water tank may be provided. Furthermore, other working fluids that are not fuels may also be used. In such case, a tank to store such fluids would be provided.

Regardless of the type of working fluid that is used, the working fluid is heated in the heat exchanger expansion media tubes 150 and is directed through a manifold (not shown) to a motor (not shown) under high pressure. The working fluid moves the motor's pistons, which are located in cylinders, so as to power the motor in power strokes. Once the working fluid has been used to move the motor's pistons, it is exhausted from the cylinders in an exhaust stroke, while still under pressure relative to ambient air pressure.

In the case where the working fluid is fuel, after the working fluid is exhausted from the cylinders in an exhaust stroke, it is directed to the combustion chamber, where it is introduced to ambient air (possibly with a blower) to assist with creating the centrifugal motion of the air/fuel mixture in the combustion chamber.

The fuel vapor, upon entering the combustion chamber, passes by an air inlet valve 185, where the ambient air is drawn into the high velocity fuel vapor. The fuel vapor, now having been combined with the oxygen in the ambient air, is ignited with a high temperature device, such as a spark plug 310, glow plug and/or preheated walls of the combustion chamber.

The high velocity fuel vapor exhausted from the cylinders increases its speed as it enters the combustion chamber as a result of the lower pressure inside the combustion chamber (using Bernoulli's principle). The fuel vapor also enters the chamber at an angle.

As a result of having an abundance of oxygen in the combustion chamber, the fuel burns lean and hot. The fuel burns for a much longer time in the heat exchanger than with convention cylinder combustion or with a conventional steam engine boiler. Accordingly, more opportunity is given to completely burn any fuel and, consequently, harvest more energy in the combustion process.

Fresh fuel is introduced into the system directly into the expansion media tubes 150 and, if needed, directly into the combustion chamber 120. Unburned fuel vapor exhausted from the motor is directed through fuel vapor manifold inlet 195 into the combustion chamber 120, which is the primary source of the fuel for the heat exchanger vortex tube 110. A high-pressure pump (not shown) serves as a throttle when pumping fuel from the fuel tank into the expansion media tubes 150.

When the heat exchanger is shut off, fuel stops entering expansion media tubes 150 and combustion chamber 120. In one embodiment, two sets of expansions tubes could be used in order to have one be cleaned (e.g., with fresh fuel, etc.), while the other is pressurizing fuel in preparation for entering the cylinders of the motor. Whether one or two sets of tubes are used, the tubes are designed to withstand a very high amount of pressure.

In connection with starting-up the heat exchanger 100, a fuel injector 320 is provided.

In FIG. 2, it should be noted that the individual sizes of the vortex tube 110, combustion chamber 120 and manifolds (e.g., fuel vapor manifold 205, fresh air manifold 215) are not to scale. Furthermore, the relative sizes to one another may be different than that shown in the figures.

For example, the fuel vapor manifold 205 is shown as being rather large, but it likely will have a very thin chamber between its outer wall and the outer wall of the combustion chamber 120. On the other hand, the fresh air manifold 215 may be the same size as the combustion chamber 120, but may be larger or smaller than combustion chamber 120.

In the top drawing, the combustion chamber 120 is actually the same size as the fresh air manifold 215. The combustion chamber 120 appears to be smaller because the combustion chamber side of the gas return path 160 acts as a manifold for the warm air and shows the bores for two of the four warm gas return ports. The bores for the opposite side manifold or fresh air manifold 215 are not shown in the top drawing. Therefore, it appears larger compared to the warm gas return side.

With the heat exchanger 100, the warm return air is free flowing, such that the fuel vapor flows according to how much fresh fuel is pumped into the expansion media tubes 150 (and returned from the cylinders). The fresh air ports may be free flowing ambient air or pressurized air from a blower (one or more valves may be needed).

In FIG. 4, the bores for the ports operate like whistles. The fuel vapor ports (A) are bored in from the top of the combustion chamber. The fresh air ports (B) are bored in from the outside side of the combustion chamber, and the warm gas return ports (C) are bored in from the inside side of the combustion chamber.

A fresh fuel line is connected to the inlet port 350 of the inlet/outlet manifold 330 and provides fresh fuel to expansion media tubes 150. After the fuel circulates through the expansion media tubes 150 and is heated (which causes the fuel to become a pressurized vapor), it exits through the outlet port 340 of the inlet/outlet manifold 330, where it is directed to the motor.

It should be understood that instead of having a circular cross-sectional shape, the cross-sectional shape of the walls of the vortex tube 110 may be polygonal or even some other shape. It should be understood that other components which have circular cross-sectional shapes may instead have a polygonal or other cross-sectional shape.

Several embodiments of the invention have been described. It should be understood that the concepts described in connection with one embodiment of the invention may be combined with the concepts described in connection with another embodiment (or other embodiments) of the invention.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A heat exchanger for an engine comprising:

a first tube have a first diameter;

a second tube having a second diameter, wherein the second diameter is larger than the first diameter;

a third tube having a third diameter, wherein the third diameter is larger than the second diameter, wherein a vortex of hot gases is created in the first tube and travels in a first direction, wherein cool gases travel in a direction opposite to the first direction in the first tube, and wherein warm gases travel in a direction opposite to the first direction between the second tube and the third tube.

2. The heat exchanger of claim 1, further including expansion media tubes between the first tube and the second tube.

3. The heat exchanger of claim 2, wherein the expansion media tubes have a working fluid therein and wherein the hot gases and warm gases heat the working fluid.

4. The heat exchanger of claim 3, wherein the working fluid is fuel.

5. The heat exchanger of claim 3, wherein the working fluid is water.

6. The heat exchanger of claim 3, wherein the working fluid is delivered to a cylinder in which it expands, so as to move a piston.

7. The heat exchanger of claim 6, wherein, after the working fluid expands in the cylinder, it is recovered and burned in a combustion chamber.

8. The heat exchanger of claim 1, further including a combustion chamber which is in fluid communication with the first tube.

9. The heat exchanger of claim 8, wherein the warm gases flow into the combustion chamber.

10. The heat exchanger of claim 9, wherein the warm gases include unburned fuel.

11. The heat exchanger of claim 10, further including:

the unburned fuel in the warm gases is ignited in the combustion chamber.

* * * * *